(12) United States Patent
Ström

(10) Patent No.: US 10,995,036 B2
(45) Date of Patent: May 4, 2021

(54) HEATING ELEMENT

(71) Applicant: Sandvik Intellectual Property AB, Sandviken (SE)

(72) Inventor: Erik Ström, Västerås (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 16/981,318

(22) PCT Filed: Mar. 15, 2019

(86) PCT No.: PCT/EP2019/056627
§ 371 (c)(1),
(2) Date: Sep. 16, 2020

(87) PCT Pub. No.: WO2019/179903
PCT Pub. Date: Sep. 26, 2019

(65) Prior Publication Data
US 2021/0009475 A1  Jan. 14, 2021

(30) Foreign Application Priority Data

Mar. 15, 2019  (WO) ................ PCT/EP2019/056627

(51) Int. Cl.
  C04B 35/58  (2006.01)
  C04B 35/64  (2006.01)
  (Continued)
(52) U.S. Cl.
  CPC ...... C04B 35/58092 (2013.01); C04B 37/001 (2013.01); *C04B 2235/349* (2013.01);
  (Continued)

(58) Field of Classification Search
  CPC .. C04B 35/58092; C04B 37/001; H05B 3/148
  See application file for complete search history.

(56) References Cited

U.S. PATENT DOCUMENTS

| 3,051,924 A | 8/1962 | Amberg et al. |
| 6,919,544 B2 * | 7/2005 | Sundberg .......... C04B 35/58092 219/548 |

(Continued)

FOREIGN PATENT DOCUMENTS

| AT | 179 100 B | 7/1954 |
| KR | 10-2004-0105843 A | 12/2004 |

(Continued)

OTHER PUBLICATIONS

International Search Report and Written Opinion dated May 20, 2019, issued in corresponding International Patent Application No. PCT/EP2019/056627.

*Primary Examiner* — Karl E Group
(74) *Attorney, Agent, or Firm* — Morgan, Lewis & Bockius LLP

(57) ABSTRACT

The present disclosure relates to a heating element comprising at least two parts which are composed of different molybdenum disilicide-based compositions, wherein at least one of the molybdenum disilicide-based parts is based on a chromium-alloyed based molybdenum disilicide composition ($(Mo_{1-x}Cr_x)Si_2$ where x is of from 0.05 to 0.25); and at least one part is based on a molybdenum disilicide-based composition comprising more than or equal to 90 weight % $Mo(Si,Al)_2$. The present disclosure also relates to the use of the heating element.

13 Claims, 2 Drawing Sheets

(51) Int. Cl.
  *H05B 3/14*    (2006.01)
  *C04B 37/00*   (2006.01)
(52) U.S. Cl.
  CPC .............. *C04B 2235/3418* (2013.01); *C04B 2235/402* (2013.01); *C04B 2235/404* (2013.01); *C04B 2235/428* (2013.01); *C04B 2235/6021* (2013.01)

(56) References Cited

U.S. PATENT DOCUMENTS

| | | | |
|---|---|---|---|
| 7,034,260 B2 | 4/2006 | Sundberg et al. | |
| 7,166,823 B2 * | 1/2007 | Sundberg | C04B 35/58092 219/553 |
| 10,544,062 B2 * | 1/2020 | Strom | C04B 35/58092 |
| 2004/0056021 A1 * | 3/2004 | Sundberg | C04B 35/58092 219/548 |
| 2004/0094535 A1 * | 5/2004 | Sundberg | C04B 35/58092 219/548 |
| 2005/0236399 A1 | 10/2005 | Sunberg et al. | |
| 2011/0240911 A1 * | 10/2011 | Sundberg | C04B 35/58092 252/71 |
| 2012/0168431 A1 | 7/2012 | Sundberg et al. | |
| 2019/0002355 A1 * | 1/2019 | Strom | H05B 3/141 |

FOREIGN PATENT DOCUMENTS

| | | |
|---|---|---|
| KR | 10-2012-0027218 A | 3/2012 |
| WO | 2017/108694 A1 | 6/2017 |

\* cited by examiner

HEATING ELEMENT

TECHNICAL FIELD

The present disclosure relates to a heating element composed at least two parts based on different molybdenum disilicide-based compositions, wherein at least one of the molybdenum disilicide-based parts is based on a chromium-alloyed based molybdenum disilicide composition and at least one part of the molybdenum disilicide-based parts is based on a molybdenum disilicide-based composition comprising more than or equal to 90 weight % Mo(Si,Al)$_2$. The present disclosure also relates to the use of the heating element and to a furnace comprising said heating element.

BACKGROUND

Molybdenum disilicide-based materials are well known in high temperature applications such as in furnaces. Heating elements made of these materials have good performance at high temperatures, such as above 1800° C., in air because of the formation of a protective silicon dioxide (SiO$_2$) layer, also known as silica glass.

When heating molybdenum disilicide-based materials in air, both the molybdenum and the silica will oxidize. The oxide formed from molybdenum will become volatile and evaporate and the oxide formed from silica will form a protective oxide layer on the heating element, which in turn will prevent the heating element from corroding and from being exposed to wear degradation. However, at low temperatures (400 to 600° C.), molybdenum dioxide will remain in the silicon dioxide layer and disturbed the formation of a continuous SiO$_2$ layer. This will lead to a continuous consumption of the material of the heating element and is a phenomenon known as "pesting" or "pest".

In furnaces, especially in industrial furnaces, there is a problem with degradation of heating elements. Industrial furnaces have zones having high temperature (heat zones) and zones having low temperature (cold zones). In the heat zones, pesting is usually not an issue as a layer of protective silicon dioxide will be formed immediately. However, the parts of the heating element which are in the cold zones will have problems with pesting and thereby these parts will be exposed to corrosion and wear degradation, which eventually will lead to element failure. Yet another problem associated with pesting is contamination of the material being heated due to falling oxide flakes from the failed elements.

Furthermore, it is known that additions of aluminium to MoSi$_2$ containing compositions will dramatically improve the pest resistance of heating elements made thereof. However, the problem with aluminium is that it will form hexagonal Mo(Si,Al)$_2$ and parts containing Mo(Si,Al)$_2$ are very difficult to join by welding to parts comprising MoSi$_2$ because of the difference in strength between these two materials at the high temperatures required for joining. Also, the power loss due to unnecessary heating of the terminal will increase because hexagonal Mo(Si,Al)$_2$ has higher electrical resistivity than tetragonal (Mo,Cr)Si$_2$.

The aim of the present disclosure is to eliminate or at least to reduce the above-mentioned problems.

SUMMARY

The aspect of the present disclosure is therefore to provide a heating element which is suitable for use in a furnace, such as an industrial furnace, and which will withstand or at least reduce the above-mentioned problems.

The present disclosure therefore provides a heating element comprising at least two molybdenum disilicide-based parts which parts are based on different molybdenum disilicide-based compositions, wherein at least one of the molybdenum disilicide-based parts is based on molybdenum disilicide-based composition having more than or equal to 90 weight % of (Mo$_{1-x}$Cr$_x$)Si$_2$ where x is of from 0.05 to 0.25; and wherein at least one of molybdenum disilicide-based parts is based on a molybdenum disilicide-based composition comprising more than or equal to 90 weight % Mo(Si,Al)$_2$.

The obtained heating element will have a lower power loss due to unnecessary heating of the terminal especially during startup of the furnace. Additionally, the obtained heating element will have a high resistance against pest.

The part(s) of the heating element based on the molybdenum disilicide-based composition comprising more than or equal to 90 weight % Mo(Si,Al)$_2$ is preferably to be used in the hot zones of the heating element, i.e. in zones having a temperature above 600° C.

Furthermore, the present disclosure also relates to a fixed contact comprising a heating element as defined hereinabove or hereinafter.

The present disclosure also relates to a furnace, such as an industrial furnace comprising a heating element as defined hereinabove or hereinafter.

DETAILED DESCRIPTION

Figure 1:
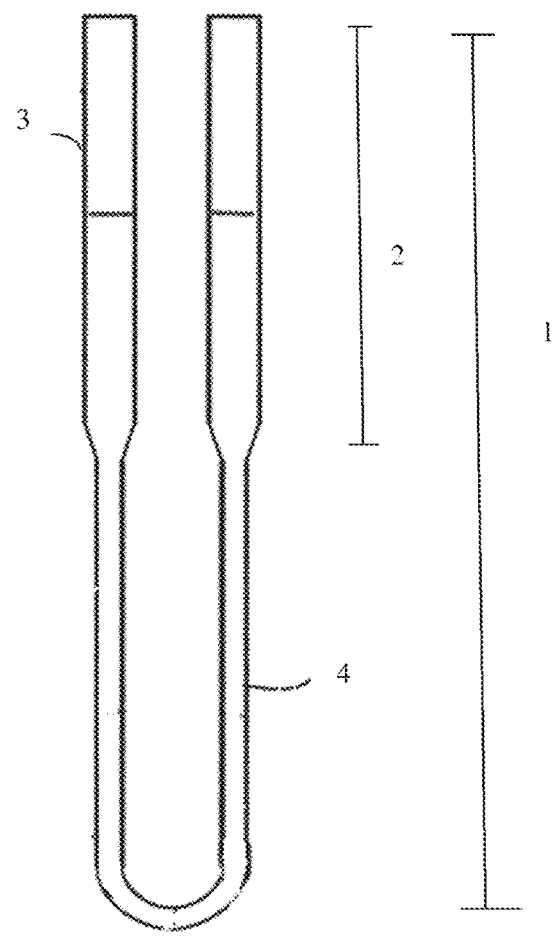
FIG. 1 illustrates a heating element according to one embodiment of the present disclosure.

The present disclosure relates to a heating element comprising at least two molybdenum disilicide-based parts which parts are based on different molybdenum disilicide-based compositions, wherein at least one of the molybdenum disilicide-based parts is based on a molybdenum disilicide-based composition having more than or equal to 90 weight % (wt %) of (Mo$_{1-x}$Cr$_x$)Si$_2$ wherein x is of from 0.05 to 0.25, and wherein at least one of molybdenum disilicide-based parts is based on a molybdenum disilicide-based composition comprising more than or equal to 90 weight % Mo(Si,Al)$_2$. Thus, one part is based on one molybdenum disilicide-based composition and one part is based on another molybdenum disilicide-based composition.

The design of the present heating element will provide for a decrease or even an elimination of pesting without compromising the high temperature performance of the heating element in the heating zone because the heating element has a combination of at least two parts wherein one part is based on one molybdenum disilicide-based and the other part is based on another molybdenum disilicide-based composition. Thus, the parts will have different properties. Additionally, the design of the heating element will provide for lower power loss due to unnecessary heating of the terminal.

The part(s) of the heating element, which will be exposed to the cold zones (400 to 600° C.), of a furnace is based on the molybdenum disilicide-based composition comprising more than or equal to 90 wt % of (Mo$_{1-x}$Cr$_x$)Si$_2$ wherein x is of from 0.05 to 0.25. The balance of the composition may be aluminosilicate clay and/or one or more inorganic oxides, such as $SiO_2$. According to one embodiment, the aluminosilicate clay is of the montmorillonite type for example bentonite.

According to one embodiment, the molybdenum disilicide-based composition, wherein part of the molybdenum (Mo) is replaced by chromium (Cr), comprises more than or equal to 95 wt % of $(Mo_{1-x}Cr_x)Si_2$ and the balance is aluminosilicate clay and/or one or more inorganic oxides.

According to one embodiment, and in order to reduce the pesting even more, x is between 0.10 to 0.20, such as between 0.15 to 0.20.

It has been showed that a chromium alloyed molybdenum disilicide-based composition will not form molybdenum oxides in the cold zones, which means that the silica dioxide layer formed will be continuous and therefore will not be exposed to degradation due to corrosion and/or wear. In the present disclosure, the terms "$(Mo,Cr)Si_2$-based material" and "$(Mo_{1-x}Cr_x)Si_2$" and "a chromium-alloyed based molybdenum disilicide" and "chromium-alloyed molybdenum disilicide-based composition" are used interchangeably.

Furthermore, the part(s) of the heating element exposed to the heat zones (i.e. above 600° C.) is (are) based on (manufactured from) a molybdenum disilicide based composition comprising more than or equal to 90 weight % $Mo(Si,Al)_2$. The balance of the composition may be aluminosilicate clay and/or one or more inorganic oxides, such as $SiO_2$. According to one embodiment, the aluminosilicate clay is of the montmorillonite type for example bentonite.

It has surprisingly been found that a $(Mo_{1-x}Cr_x)Si_2$-based part will be readily joinable (connected) to a $Mo(Si,Al)_2$ based part. Without being bond to any theory, it is believed that chromium is the key element. Additionally, not only pesting within the furnace will be reduced by joining parts of these two compositions, the amount of non-desirable heat formation will also be reduced because of the low resistivity of $(Mo,Cr)Si_2$ compared to $Mo(Si,Al)_2$. Thus, the joints will be less affected due to different thermal expansion of the materials.

The parts may, as mentioned above, also comprise less than or equal to 10 weight-% (wt %) of an aluminosilicate clay and/or one or more inorganic oxides, such as $SiO_2$. According to one embodiment, the aluminosilicate clay is of the montmorillonite type for example bentonite. will function as extrusion aids and/or sintering aids.

The at least one part based on a composition comprising more than or equal to 90 weight % $Mo(Si,Al)_2$ may comprise a $Mo(Si,Al)_2$ based matrix phase and up to 5 vol % $Mo_5(Si,Al)_3$ and up to 15 vol % $Al_2O_3$, respectively.

According to one embodiment, the heating element as defined hereinabove or hereinafter comprises or consists of two parts of different molybdenum disilicide-based compositions. According to another embodiment, the heating element as defined hereinabove or hereinafter comprises or consists of three parts, wherein two of the parts are composed of the same molybdenum disilicide-based composition. According to another embodiment, the heating element as defined hereinabove or hereinafter comprises or consists of four molybdenum disilicide-based parts wherein two parts are based on the chromium alloyed molybdenum disilicide composition as defined hereinabove or hereinafter. According to another embodiment, the heating element comprises or consist of two parts based on the $(Mo_{1-x}Cr_x)Si_2$ composition and one part based on the $Mo(Si,Al)_2$ composition.

Referring to the drawings, a heating element comprises a section known as terminal(s) (see FIG. 1). The cold zone is usually located in this section. According to one embodiment, the terminal is preferably based on the part comprising the chromium alloyed molybdenum disilicide-based composition but a small section of the terminal could also be made from the material to be used in the heat zone. The heat zone section is preferably manufactured from the other molybdenium disilicide composition. The whole terminal may be composed of the chromium alloyed molybdenum disilicide-based composition. The terminal may have a larger diameter than the heating zone. The terminal may also be adapted to extend to the outside of the furnace through the furnace wall and to be electrically connected on the outside of the furnace.

FIG. 1 illustrates examples of a heating element according to the present disclosure. FIG. 1 discloses a heating element 1. The heating element 1 has terminals 2. Parts 3 of the terminals are composed of chromium alloyed molybdenum disilicide composition and a part is composed of a molybdenum disilicide-based composition suitable for hot zone 4.

Figure 2A:
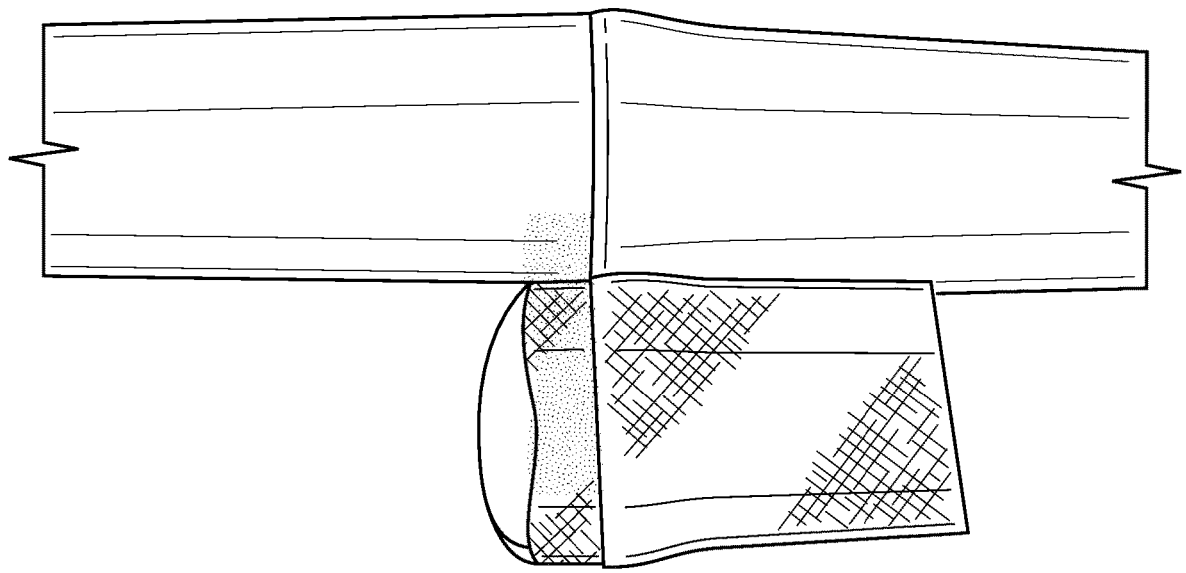
FIG. 2A shows a joint between Mo(Si,Al)$_2$-based material (left hand side) and Cr-alloyed MoSi$_2$-based material. Lower part of the figure shows the joint in cross section.
Figure 2B:
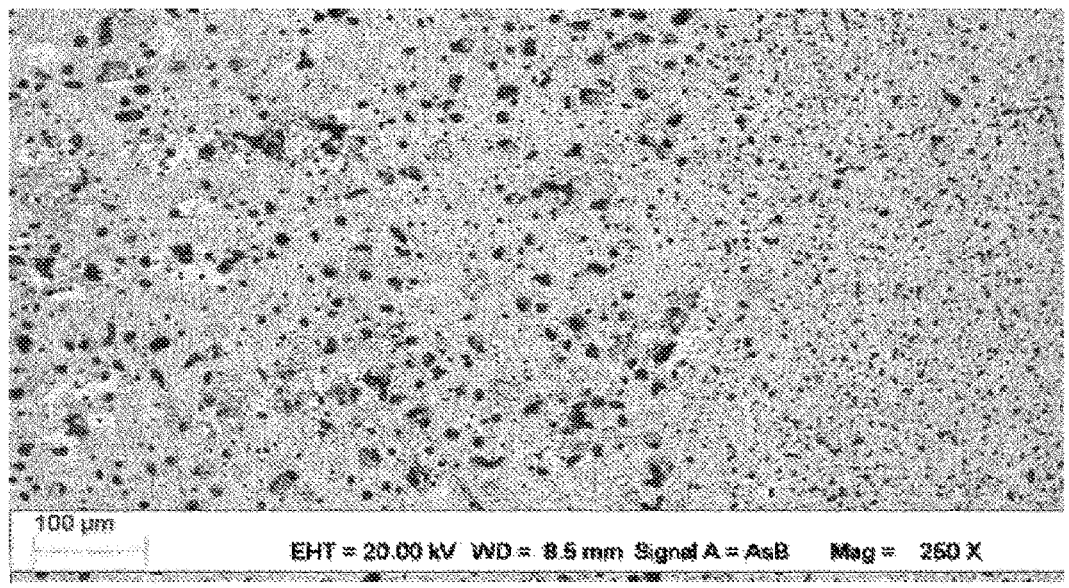
FIG. 2B shows a scanning electron micrograph (backscattered mode) showing a joint between Mo(Si,Al)$_2$-based material (left hand side) and (Mo,Cr)Si$_2$-based material.

The parts of a heating element may be joined by using welding, such as diffusion welding or by using induction heating and then subsequently applying an external pressure perpendicular to the joint. Passing an electrical current through the joint and then simultaneously applying external pressure perpendicular to the joint may also be used. FIG. 2 shows a joint between $Mo(Si,Al)_2$-based material (left hand side) and Cr-alloyed $MoSi_2$-based material wherein the joining has been performed by diffusion welding.

The different parts of the heating element may be formed into rod or other forms and then connected. Furthermore, the parts may be shaped as U-elements but also as multi-shank, helical, diffusion cassettes, flat panels, etc. The different parts may thus be in the form of rods and may be bended or straight depending on the intended use of the heating element. The cross-section of the rod may typically be circular, but depending on the application, other geometrical shapes may also be possible such as elliptical or rectangular.

According to one embodiment, the part(s) based on the $(Mo,Cr)Si_2$-based material is (are) long enough to cover the zone(s) having a temperature range of 400-600° C. during operation.

According to one embodiment, said part(s) is (are) in the form of a rod having a diameter of 1 to 30 mm and a length of 1 to 40 cm.

In the present description, the expression "the part is based on a composition" is intended to mean that at least 70 weight % of the part is based on that composition.

The present disclosure is further described by the following non-limiting example.

EXAMPLE

Two mixtures of molybdenum, silicon and chromium powders were prepared and heated in argon to form $Mo_{0.85}Cr_{0.15}Si_2$. The obtained product was milled and subsequently mixed with 5 wt % aluminosilicate (bentonite clay of the montmorillonite type) and water to form a paste for extrusion. The formed paste was extruded into 9 mm diameter rods, which were subsequently dried and pre-sintered in hydrogen. Final sintering to achieve full density was then performed by resistance heating in air. The diameter end surfaces of the rods were ground.

9 mm rods of $Mo(Si,Al)_2$-based materials were provided and the diameter end surfaces of the rods were ground.

The rods were heated under protective gas using an induction coil. The rods were pushed together when the temperature reached 1550-1650° C., and a pressure of 400-600 N was applied for 15-60 s (diffusion bonding). Longitudinal sections of the joint were analyzed in a scanning electron microscope and successful bonding between the two materials was confirmed, see FIGS. 2A and B.

The invention claimed is:

1. A heating element composed of at least two molybdenum disilicide-based parts
   wherein at least one of the molybdenum disilicide-based parts is based on a molybdenum disilicide-based composition having more than or equal to 90 weight % of $(Mo_{1-x}Cr_x)Si_2$ where x is of from 0.05 to 0.25; and
   wherein at least one of molybdenum disilicide-based parts is based on a molybdenum disilicide-based composition comprising more than or equal to 90 weight % $Mo(Si,Al)_2$.

2. The heating element according to claim 1, wherein the heating element consists of two molybdenum disilicide-based parts.

3. The heating element according to claim 1, wherein the heating element consists of three molybdenum disilicide-based parts wherein two parts of the are based on the same molybdenum disilicide-based composition and one part is based on another molybdenum disilicide-based composition.

4. The heating element according to claim 3, wherein two parts are based on a molybdenum disilicide-based composition having more than or equal to 90 weight % of $(Mo_{1-x}Cr_x)Si_2$ where x is of from 0.05 to 0.25; and one part is based on a molybdenum disilicide-based composition comprising more than or equal to 90 weight % $Mo(Si,Al)_2$.

5. The heating element according to claim 1, wherein the heating element consists of four molybdenum disilicide-based parts and wherein two parts of the heating element are based on a molybdenum disilicide-based composition having more than or equal to 90 weight % of $(Mo_{1-x}Cr_x)Si_2$ where x is of from 0.05 to 0.25 and two parts of the heating element are based on a molybdenum disilicide-based composition comprising more than or equal to 90 weight % $Mo(Si,Al)_2$.

6. The heating element according to claim 1, wherein the molybdenum disilicide-based composition having more than or equal to 90 weight % of $(Mo_{1-x}Cr_x)Si_2$ where x is 0.05 to 0.25 also comprises less than or equal to 10 weight % aluminosilicate and/or one or more inorganic oxide.

7. The heating element according to claim 1, wherein x is between 0.10 and 0.20.

8. The heating element according to claim 1, wherein the molybdenum disilicide-based composition containing $(Mo_{1-x}Cr_x)Si_2$ comprises more than or equal to 95 weight % of $(Mo_{1-x}Cr_x)Si_2$.

9. The heating element according to claim 1, wherein the molybdenum disilicide-based composition based on more than or equal to 90 weight % $Mo(Si,Al)_2$ also comprises less than or equal to 10 weight % aluminosilicate and/or one or more inorganic oxide.

10. The heating element according to claim 1, wherein the least one part composed of a composition based on more than or equal to 90 weight % $Mo(Si,Al)_2$ also comprises a $Mo(Si,Al)_2$ based matrix phase and up to 5 vol % $Mo_5(Si,Al)_3$ and up to 15 vol % $Al_2O_3$, respectively.

11. A fixed contact comprising a heating element according to claim 1.

12. A furnace comprising a heating element according to claim 1.

13. The heating element according to claim 7, wherein x is between 0.15 to 0.20.

* * * * *